United States Patent
Reiners et al.

(10) Patent No.: US 10,870,383 B2
(45) Date of Patent: Dec. 22, 2020

(54) TAILGATE TIE DOWN SYSTEMS

(71) Applicant: FORD GLOBAL TECHNOLOGIES, LLC, Dearborn, MI (US)

(72) Inventors: Robert Reiners, Grosse Ile, MI (US); Jack Marchlewski, Saline, MI (US); Joshua Robert Hemphill, White Lake, MI (US); Jeffrey Gray, Dearborn, MI (US); Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/742,117

(22) Filed: Jan. 14, 2020

(65) Prior Publication Data

US 2020/0148092 A1    May 14, 2020

Related U.S. Application Data

(62) Division of application No. 15/862,938, filed on Jan. 5, 2018, now Pat. No. 10,576,867.

(51) Int. Cl.
*B60P 7/08* (2006.01)

(52) U.S. Cl.
CPC .............. *B60P 7/0807* (2013.01); *B60P 7/08* (2013.01); *B60P 7/083* (2013.01)

(58) Field of Classification Search
CPC ............ B60P 7/083; B60P 7/0807; B60P 7/08
USPC ............................................ 410/97, 98, 100
See application file for complete search history.

(56) References Cited

U.S. PATENT DOCUMENTS

| | | | |
|---|---|---|---|
| 2,011,349 A | 8/1935 | Sykes | |
| 4,229,132 A | 10/1980 | Taylor | |
| 5,007,568 A * | 4/1991 | Da Vault | B23Q 13/00 211/4 |
| 5,011,349 A | 4/1991 | McAndrews | |
| 5,349,834 A * | 9/1994 | Davidge | E05B 15/1607 156/306.6 |
| 5,768,920 A * | 6/1998 | DeBevoise | E05B 73/0005 70/18 |
| 6,604,390 B1 * | 8/2003 | Nooner | B65D 55/14 109/50 |
| 6,799,927 B2 | 10/2004 | Wheatley | |
| 6,948,755 B1 | 9/2005 | Bauer | |
| 7,032,937 B2 | 4/2006 | Boecker et al. | |
| 7,186,914 B1 * | 3/2007 | Knight | B62H 5/003 174/50 |
| 7,841,815 B1 | 11/2010 | Lane | |

(Continued)

OTHER PUBLICATIONS

Snap-Loc Cargo Straps & Square-Hole E-Track Anchors, 15 pages, etrailer.com; https://www.etrailer.com/faq-news-snap-loc-2011-update.aspx.

*Primary Examiner* — Hilary L Gutman
(74) *Attorney, Agent, or Firm* — David Coppiellie; Carlson, Gaskey & Olds (57) ABSTRACT

A tailgate tie down system includes a first plate assembly and a second plate assembly. A strap is connected between each of the first plate assembly and the second plate assembly. In an exemplary method, the strap can be routed through at least one accessory tool before securing the first plate assembly and the second plate assembly within tailgate latch openings. Once the plate assemblies are locked within the latch openings, the accessory tool is also locked relative to the tailgate.

13 Claims, 5 Drawing Sheets

(56) References Cited

U.S. PATENT DOCUMENTS

| | | |
|---|---|---|
| 8,007,021 B2 | 8/2011 | Pleet et al. |
| 8,142,121 B2 | 3/2012 | Griffith |
| 8,272,821 B2 | 9/2012 | Digman |
| 8,434,978 B2 | 5/2013 | Tardif et al. |
| 8,532,873 B1 | 9/2013 | Bambenek et al. |
| 8,714,657 B1 | 5/2014 | McKinley |
| 9,346,390 B1 | 5/2016 | Croswhite |
| 9,738,204 B1 | 8/2017 | Stojkovic et al. |
| 10,300,834 B1 | 5/2019 | Allen |
| 2001/0005085 A1 | 6/2001 | Bauer |
| 2003/0116986 A1 | 6/2003 | Ootsuka et al. |
| 2006/0061114 A1 | 3/2006 | Leitner |
| 2009/0160206 A1 | 6/2009 | Pleet et al. |
| 2011/0271878 A1 | 11/2011 | Parks et al. |
| 2012/0024921 A1 | 2/2012 | Pryor |
| 2014/0110363 A1* | 4/2014 | Brown ............... A47F 7/0021 211/70.8 |
| 2018/0147976 A1 | 5/2018 | Stojkovic et al. |
| 2018/0223566 A1* | 8/2018 | Smith .................. E05B 35/00 |
| 2018/0371809 A1 | 12/2018 | Fischbein et al. |
| 2019/0210509 A1* | 7/2019 | Hemphill ............ B60P 7/0807 |
| 2019/0210510 A1* | 7/2019 | Campbell ........... B60P 7/0807 |
| 2019/0283652 A1 | 9/2019 | Johnson |
| 2020/0062167 A1* | 2/2020 | Campbell ........... B60P 7/0823 |
| 2020/0149316 A1* | 5/2020 | Parker ................. E05B 39/00 |

\* cited by examiner

TAILGATE TIE DOWN SYSTEMS

CROSS-REFERENCE TO RELATED APPLICATIONS

This is a divisional of U.S. patent application Ser. No. 15/862,938, which was filed on Jan. 5, 2018, the entire disclosure of which is incorporated herein by reference.

TECHNICAL FIELD

This disclosure relates to tailgate tie down systems for securing cargo at a rearward location of a truck bed when the tailgate is in an open position.

BACKGROUND

A pickup truck includes a truck bed that serves as a cargo space for transporting various types of cargo. A tailgate is positioned at a rearward end of the truck bed. The tailgate is movable between an upright, closed position and a horizontal, open position to selectively provide access to the truck bed. Long stock cargo, such as canoes, boats, lumber, etc., may protrude outwardly past the end of the tailgate when in the open position. Customers often struggle to find rearward anchoring locations for tying down the long stock cargo to the tailgate.

SUMMARY

A tailgate tie down system according to an exemplary aspect of the present disclosure includes, among other things, a first plate assembly and a second plate assembly. A strap is irremovably connected to each of the first plate assembly and the second plate assembly when the first plate assembly and the second plate assembly are received within tailgate latch openings.

In a further non-limiting embodiment of the foregoing system, each of the first plate assembly and the second plate assembly includes a plate body and a striker barrel.

In a further non-limiting embodiment of either of the foregoing systems, the striker barrel protrudes outwardly from a vertical section of the plate body.

In a further non-limiting embodiment of any of the foregoing systems, the plate body includes a vertical section and a horizontal section, and the strap is connected to the horizontal section.

In a further non-limiting embodiment of any of the foregoing systems, the strap includes a ratchet adapted to tighten the strap between the first plate assembly and the second plate assembly.

A vehicle according to another exemplary aspect of the present disclosure includes, among other things, a tailgate including a first latch opening and a second latch opening. A tie down system includes a first plate assembly secured within the first latch opening, a second plate assembly secured within the second latch opening, and a strap extending between the first plate assembly and the second plate assembly.

In a further non-limiting embodiment of the foregoing vehicle, the vehicle is a pickup truck.

In a further non-limiting embodiment of either of the foregoing vehicles, the strap is irremovably connected to each of the first plate assembly and the second plate assembly.

In a further non-limiting embodiment of any of the foregoing vehicles, the strap is removably connected to at least one of the first plate assembly and the second plate assembly.

In a further non-limiting embodiment of any of the foregoing vehicles, each of the first plate assembly and the second plate assembly includes a plate body and a striker barrel.

In a further non-limiting embodiment of any of the foregoing vehicles, a first latch arm is mounted inside the first latch opening for engaging the striker barrel of the first plate assembly and a second latch arm is mounted inside the second latch opening for engaging the striker barrel of the second plate assembly.

In a further non-limiting embodiment of any of the foregoing vehicles, a powered latch actuator is configured to selectively lock or unlock the first latch arm and the second latch arm.

In a further non-limiting embodiment of any of the foregoing vehicles, a control module is configured to automatically actuate the powered latch actuator for locking or unlocking the first latch arm and the second latch arm in response to a user command signal.

In a further non-limiting embodiment of any of the foregoing vehicles, the user command signal is communicated in response to actuating an electronic device.

A method according to another exemplary aspect of the present disclosure includes, among other things, routing a strap of a tailgate tie down system through at least one accessory tool, securing a first plate assembly and a second plate assembly of the tailgate tie down system within opposing latch openings of a tailgate, and locking the first and second plate assemblies within the opposing latch openings, thereby locking the accessory tool relative to the tailgate.

In a further non-limiting embodiment of the foregoing methods, the method includes opening the tailgate prior to routing the strap and securing the first and second plate assemblies.

In a further non-limiting embodiment of either of the foregoing methods, securing the first and second plate assemblies includes positioning a first striker barrel of the first plate assembly within a first of the opposing latch openings, engaging a first latch arm around the first striker barrel, positioning a second striker barrel of the second plate assembly within a second of the opposing latch openings, and engaging a second latch arm around the second striker barrel.

In a further non-limiting embodiment of any of the foregoing methods, locking the first and second plate assemblies includes actuating a powered latch actuator to lock a positioning of the first latch arm and the second latch arm.

In a further non-limiting embodiment of any of the foregoing methods, the method includes actuating a key fob or a switch to command the powered latch actuator to lock the positioning of the first latch arm and the second latch arm.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details tailgate tie down systems for securing cargo within vehicle cargo spaces. An exemplary tailgate tie down system includes a first plate assembly secured within a first latch opening of a tailgate, a second plate assembly secured within a second latch opening of the tailgate, and a strap extending between the first plate assembly and the second plate assembly. The strap can be used to tie down cargo that extends up to and beyond the tailgate. The first and second plate assemblies can be locked within the latch openings to secure accessory tools relative to the tailgate. These and other features of this disclosure are described in greater detail in the following paragraphs of this detailed description.

Figure 1:
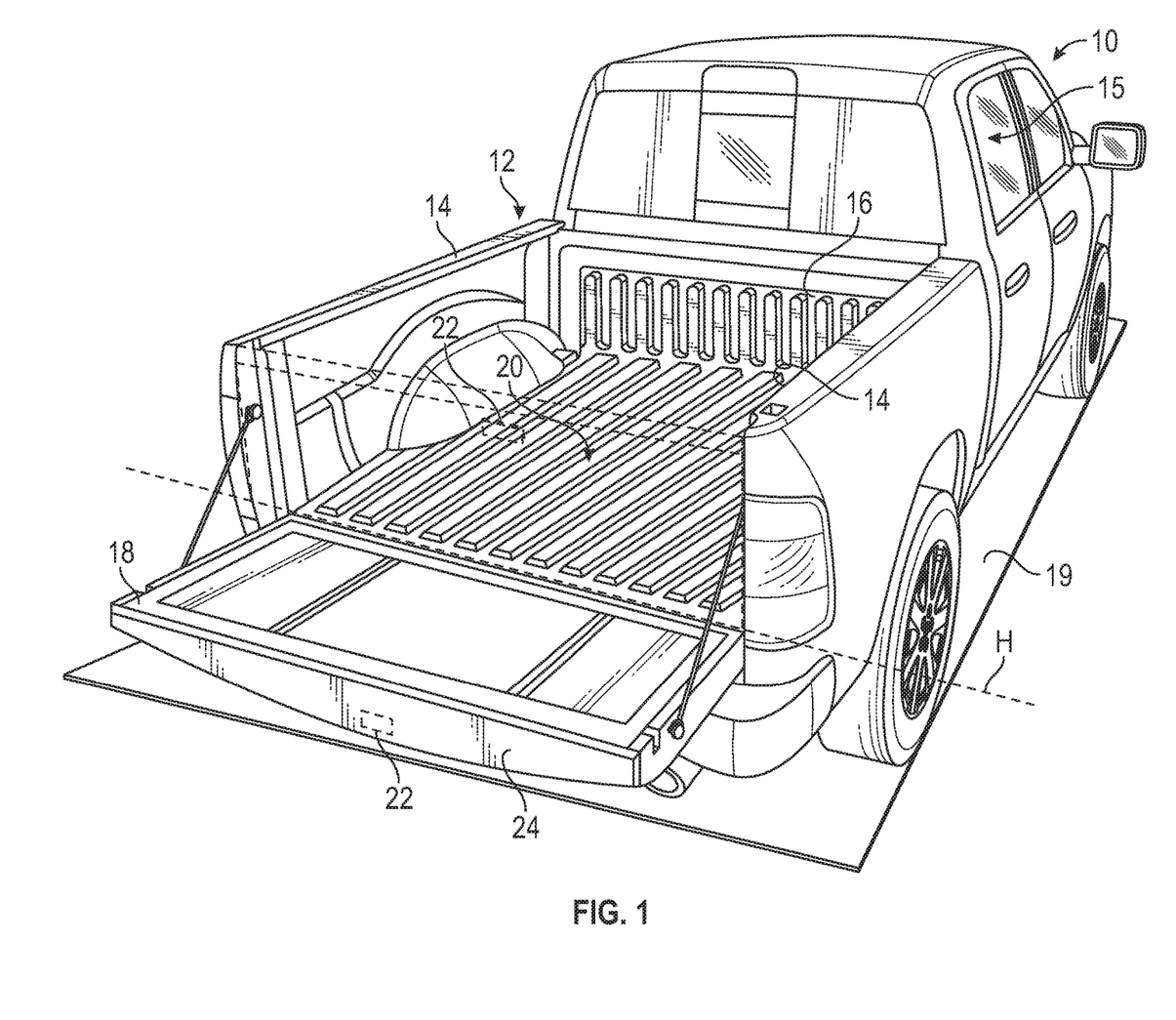
FIG. 1 illustrates a vehicle equipped with a cargo space for storing and hauling cargo at a rearward location of the vehicle.

FIG. 1 schematically illustrates a vehicle 10. In the illustrated embodiment, the vehicle 10 is a pickup truck. While a truck is pictured, other vehicles could also benefit from the teachings of this disclosure. For example, the exemplary tailgate tie down systems of this disclosure could be used to secure cargo within any vehicle cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a truck bed 12 that establishes a cargo space for storing and hauling cargo at a rear location of the vehicle 10. The truck bed 12 is generally rearward of a passenger cabin 15 of the vehicle 10 and includes a floor 20 extending between a pair of longitudinally extending side walls 14, a laterally extending front wall 16, and a tailgate 18.

The tailgate 18 is moveable between a closed position (shown in phantom) and a deployed or open position. When in the closed position, the tailgate 18 generally encloses an end of the truck bed 12 that is opposite from the front wall 16 to prevent cargo from sliding out of the truck bed 12. The tailgate 18 may be pivoted about a generally horizontal axis H to move it from the closed position to the open position and provide access to the truck bed 12. When in the open position, the tailgate 18 is generally horizontal and is parallel to a ground level 19 such that cargo can be loaded onto or unloaded from the truck bed 12.

A handle 22 is movably mounted to the tailgate 18. In use, a user can manually open the tailgate 18 by actuating the handle 22, thereby releasing the tailgate 18 for movement from the closed position to the open position.

In some instances, the owner or user of the vehicle 10 may wish to load long stock cargo 28 (see FIG. 2) within the truck bed 12. In this disclosure, the term "long stock cargo" is intended to denote cargo that includes a length dimension that is wider than its width dimension. The long stock cargo 28 could extend across a majority of the length of the truck bed 12, or could even be longer than the truck bed 12 such that it extends beyond a rear edge 24 of the tailgate 18 when the tailgate is in the open position. Lumber (e.g., two-by-fours), canoes, boats, and ladders are non-limiting examples of the types of long stock cargo that can be hauled within the truck bed 12.

The owner or user of the vehicle 10 may desire to secure or tie down the long stock cargo 28 as far rearward as possible. Tailgate tie down systems suitable for this purpose are discussed in greater detail below.

Figure 2:
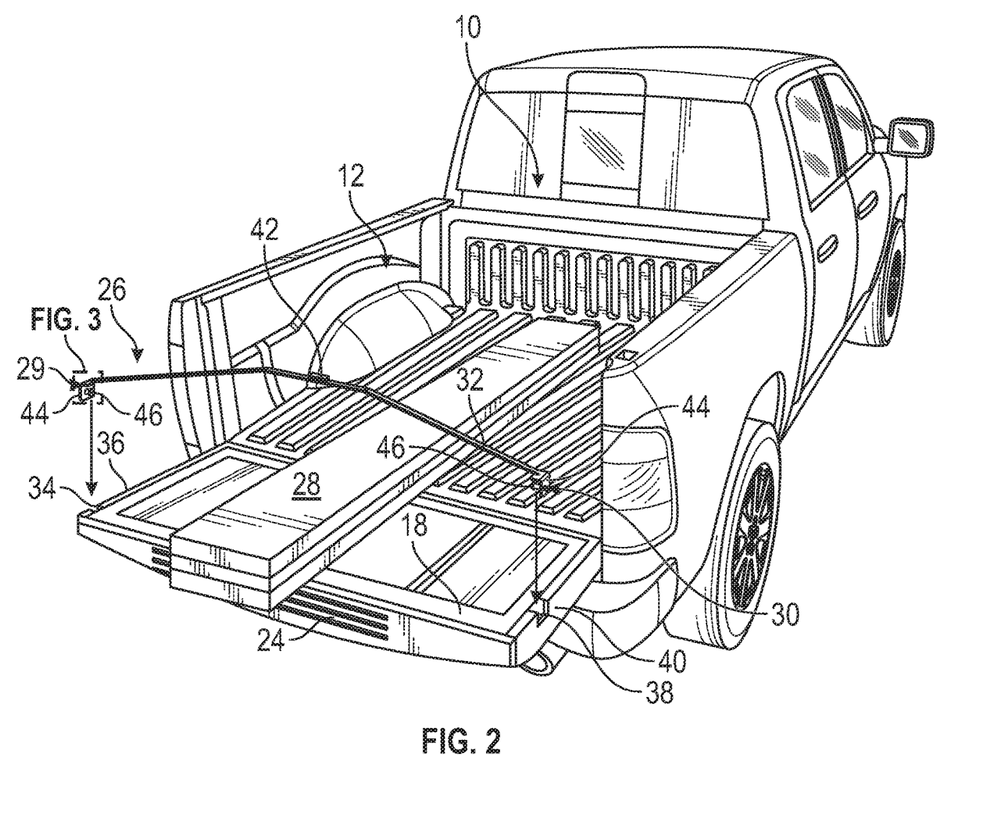
FIG. 2 illustrates a tailgate tie down system according to a first exemplary embodiment of this disclosure.

FIG. 2 illustrates a first exemplary tailgate tie down system 26 for securing (i.e., tying down) long stock cargo 28 relative to the tailgate 18. The tailgate tie down system 26 may include a first plate assembly 29, a second plate assembly 30, and a strap 32 that extends between the first plate assembly 29 and the second plate assembly 30. The first plate assembly 29 may be secured within a first latch opening 34 located at a first side edge 36 of the tailgate 18, and the second plate assembly 30 may be secured within a second latch opening 38 located at a second side edge 40 of the tailgate 18. In an embodiment, the first latch opening 34 and the second latch opening 38 are fishmouth openings. Once secured relative to the tailgate 18, the strap 32 of the tailgate tie down system 26 extends over top of the long stock cargo 28 for securing the long stock cargo 28 at a rearward location of the tailgate 18.

In an embodiment, the strap 32 is irremovably connected to each of the first plate assembly 29 and the second plate assembly 30. In another embodiment, the strap 32 is removably connected to each of the first plate assembly 29 and the second plate assembly 30. In yet another embodiment, the strap 32 is removably connected to one of the first plate assembly 29 and the second plate assembly 30 but irremovably connected to the other of the first plate assembly 29 and the second plate assembly 30.

The strap 32 may additionally include a ratchet 42 for tightening the strap 32. For example, the ratchet 42 may be actuated to pull the strap 32 taut between the first and second plate assemblies 29, 30. Tightening the strap 32 in this manner asserts a greater tie down force against the long stock cargo 28.

Figure 3:
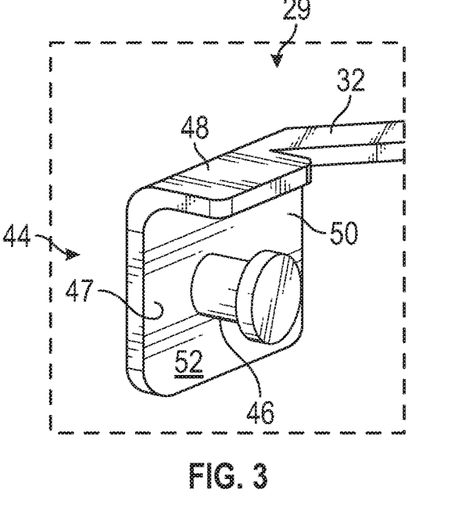
FIG. 3 illustrates a plate assembly of the tailgate tie down system of FIG. 2.

Referring now to FIGS. 2 and 3, each of the first and second plate assemblies 29, 30 may include a plate body 44 and a striker barrel 46. In an embodiment, the plate body 44 includes a vertical section 47 and a horizontal section 48 that extends from transversely away from an upper portion 50 of the vertical section 47. The striker barrel 46 may protrude outwardly from an inner surface 52 of the vertical section 47, and the strap 32 may be secured or connected to the horizontal section 48.

Figure 3A:
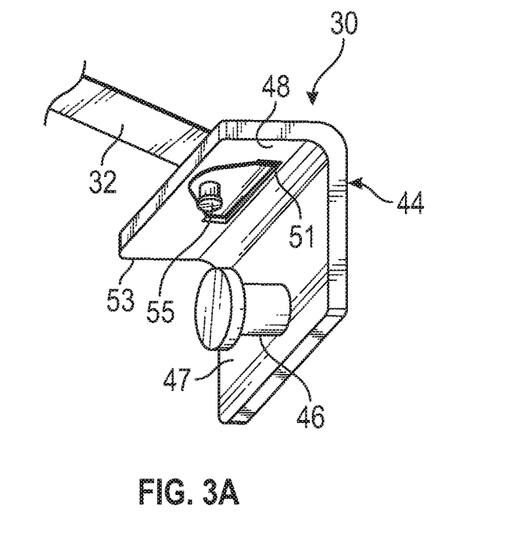
FIG. 3A illustrates another exemplary plate assembly of a tailgate tie down system.

FIG. 3A illustrates another exemplary design of the second plate assembly 30. Although illustrated with respect to the second plate assembly 30, it should be understood that the first plate assembly 29 could additionally or alternatively include the design depicted in FIG. 3A. In this embodiment, the strap 32 is removable from the second plate assembly 30 when the second plate assembly 30 is removed from the second latch opening 38 but is irremovable from the second plate assembly 30 when the second plate assembly 30 is secured within the second latch opening 38. The horizontal section 48 of the plate body 44 may include a slot 51 for receiving the strap 32. The strap 32 is positioned through the slot 51 and may then be secured to an underside 53 of the horizontal section 48 by a fastener 55. The fastener 55 may be a snap fastener or any other suitable fastener. It is not possible for an unauthorized user to gain access to the fastener 55 for removing the strap 32 once the second plate assembly 30 is secured within the second latch opening 38. Thus, in this embodiment, the strap 32 is considered irremovable from the second plate assembly 30 once second plate assembly 30 has been secured within the second latch opening 38.

Figure 4:
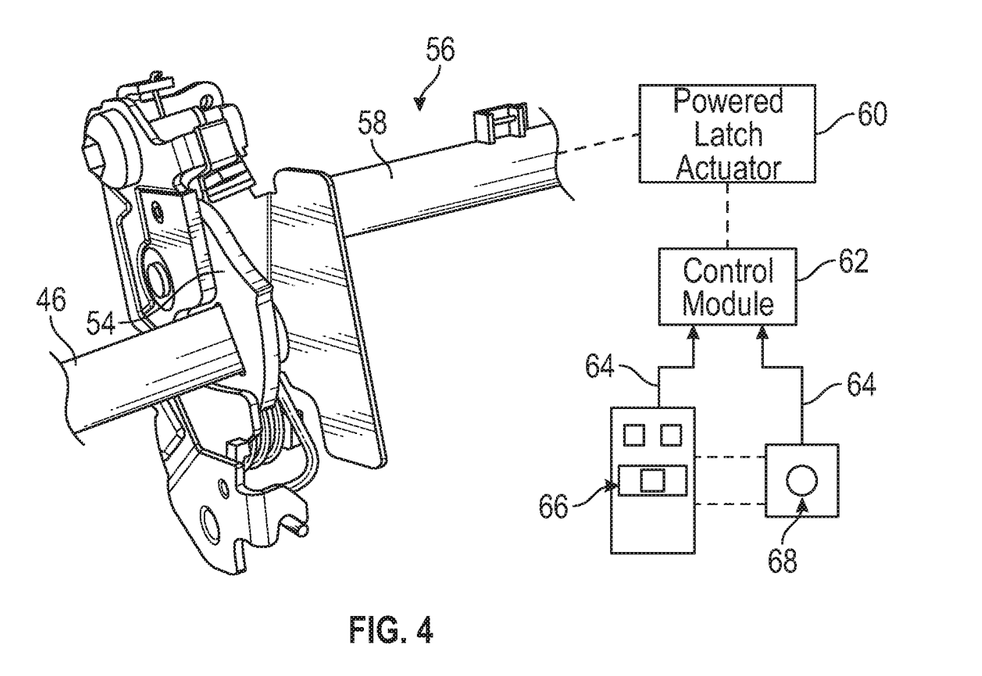
FIG. 4 illustrates an exemplary latching system for locking the plate assembly of FIG. 3 relative to the tailgate.

Referring now primarily to FIG. 4, but with continued reference to FIGS. 2 and 3, the striker barrels 46 of the first and second plate assemblies 29, 30 may be removably secured within the first and second latch openings 34, 38 by a latching system 56. For example, latch arms 54 (one associated with each latch opening 34, 38) of the latching system 56 releasably engage the striker barrels 46 for securing the first and second plate assemblies 29, 30 within the first and second latch openings 34, 38 when the tailgate 18 is in the open position.

The latching system 56 may be configured to automatically lock and unlock the latch arms 54 relative to the striker barrels 46. For example, each latch arm 54 may be operably connected to a rod 58 via one or more linkages (not shown). The rods 58 are operably connected to a powered latch actuator 60. The powered latch actuator 60 may include solenoids, electric motors with gear drives, or any other suitable electrically powered mechanism. The powered latch actuator 60 is operably connected to the latch arms 54 by the rods 58 and any intervening linkages. Actuation of the powered latch actuator 60 causes the rods 58 to shift linearly, thereby rotating the latch arms 54 to selectively lock and unlock the latch arms 54 relative to the striker barrels 46.

The latching system 56 may additionally include a control module 62 for controlling the powered latch actuator 60 to lock/unlock the striker barrels 46 of the tailgate tie down system 26. The control module 62 may be configured to actuate the powered latch actuator 60 in response to receiving a command signal 64 from an electronic device 66, such as a key-fob or cell phone, or from a switch 68 located either within the passenger cabin 15 or on the handle 22 of the tailgate 18. Locked/unlocked states of the powered latch actuator 60 can be stored within the memory of the control module 62.

The handle 22 of the tailgate 18 cannot be used to manually release the latch arms 54 when the powered latch actuator 60 has been actuated to the locked position. Thus, the latching system 56 can be controlled to either lock or unlock the tailgate tie down system 26 relative to the tailgate 18.

The configuration of the latching system 56 shown in FIG. 4 is intended to be non-limiting. Thus, it should be understood that the powered latch actuator 60 and the various other components of the latching system 56 could be controlled in various other ways within the scope of this disclosure.

Figure 5:
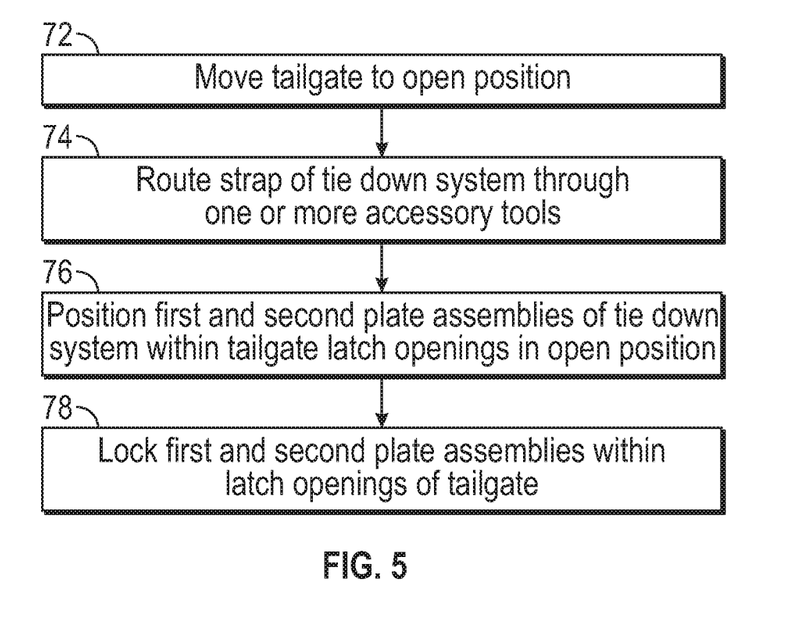
FIGS. 5 and 6 schematically illustrate an exemplary use of the tailgate tie down system of FIG. 2 for locking one or more accessory tools relative to the tailgate.
Figure 6:
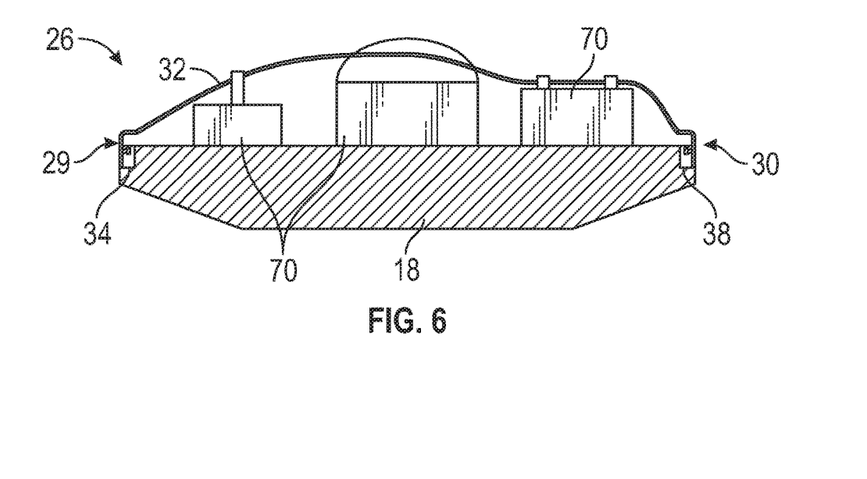

FIGS. 5 and 6, with continued reference to FIGS. 1-4, schematically illustrate an exemplary use of the tailgate tie down system 26 for locking one or more accessory tools 70 (see FIG. 6) relative to the tailgate 18. The accessory tools 70 could be any tool that the user of the vehicle 10 desires to use when on a job site or construction site. For example, the accessory tools 70 could include a miter saw, a power pack, a compressor, a radio, or any other tool commonly found at construction sites or other work sites.

In an exemplary embodiment, the accessory tools 70 can be locked relative to the tailgate 18 in the following manner First, at block 72, the tailgate is moved to the open position. The tailgate 18 may be moved to the open position by first unlocking the latching system 56 (i.e., to release latch arms 54 from strikers that are mounted to the side wall 14 of the truck bed 12) and then actuating the handle 22 to manually release the tailgate 18 for movement about the horizontal axis H.

Next, at block 74, the strap 32 of the tailgate tie down system 26 is routed through and/or around a portion of one or more accessory tools 70. This may include either first removing the strap 32 from the first plate assembly 29, the second plate assembly 30, or both, or could include routing the strap 32 through the accessory tools 70 while it is attached to one or both of the first and second plate assemblies 29, 30. The strap 32 may be routed through a handle opening or any other opening of the accessory tools 70. The strap 32 should be routed in a such a way that the accessory tools 70 can only be removed from the tailgate 18 by first removing the strap 32 from the accessory tool(s) 70.

The first plate assembly 29 is positioned within the first latch opening 34 and the second plate assembly 30 is positioned within the second latch opening 38 at block 76. This step may include positioning the striker barrels 46 of each plate assembly 29, 30 with the latch openings 34, 38 for engagement with the latch arms 54 of the latching system 56. It should be understood that an alternative embodiment is contemplated in which the plate assemblies 29, 30 are secured in place prior to routing the strap 32 through the accessory tool(s) 70.

Finally, at block 78, the first and second plate assemblies 29, 30 are locked within the latch openings 34, 38 of the tailgate 18. The first and second plate assemblies 29, 30 may be locked relative to the tailgate 18 by actuating the powered latch actuator 60, which then moves the latch arms 54 in locking engagement around the striker barrels 46. Block 78 may be automatically performed in response to a prompt from the user, such as by actuating a button on the electronic device 66 or actuating the switch 68.

Locking the first and second plate assemblies 29, 30 within the first and second latching openings 34, 38 effectively results in locking the accessory tools 70 relative to the tailgate 18. Thus, the user may wander away from the vehicle 10 without risk of the accessory tools 70 being stolen from the vehicle 10 during his/her absence.

Figure 7:
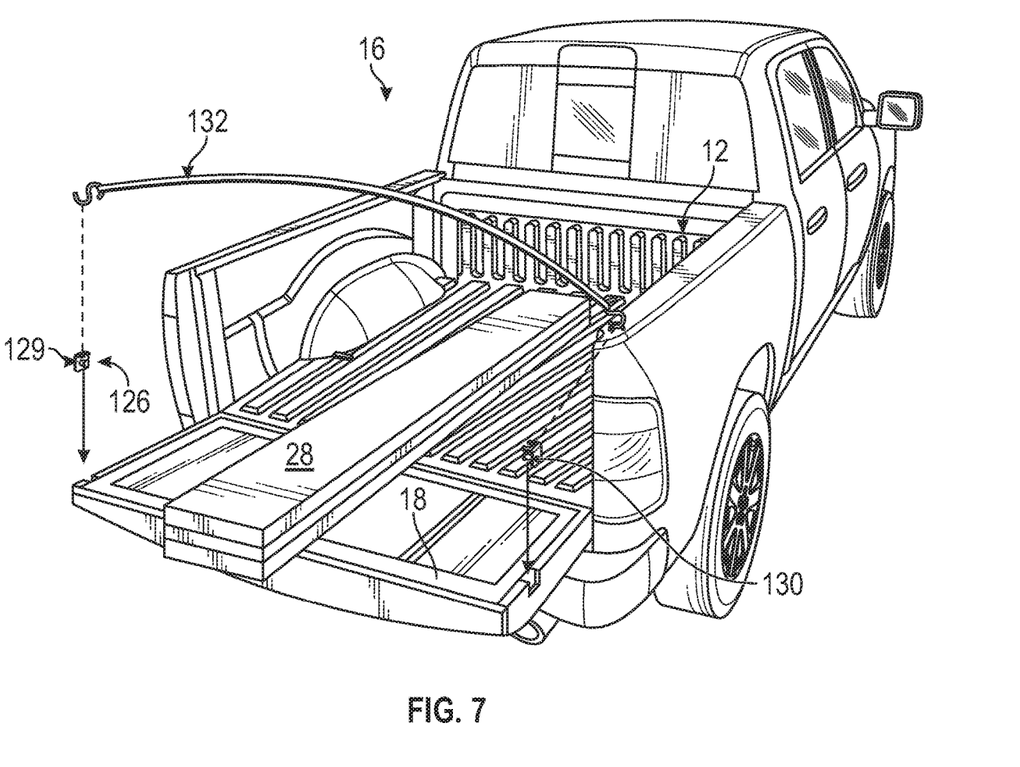
FIG. 7 illustrates a tailgate tie down system according to a second exemplary embodiment of this disclosure.

FIG. 7 illustrates another exemplary tailgate tie down system 126. In this embodiment, the tailgate tie down system 126 includes a first plate assembly 129 and a second plate assembly 130. However, rather than including an integrated strap, the first plate assembly 129 and the second plate assembly 130 are configured to accommodate a separate device 132 (e.g., bungee cord, strap, rope, etc.) that is supplied by the user for tying down the long stock cargo 28.

Figure 8A:
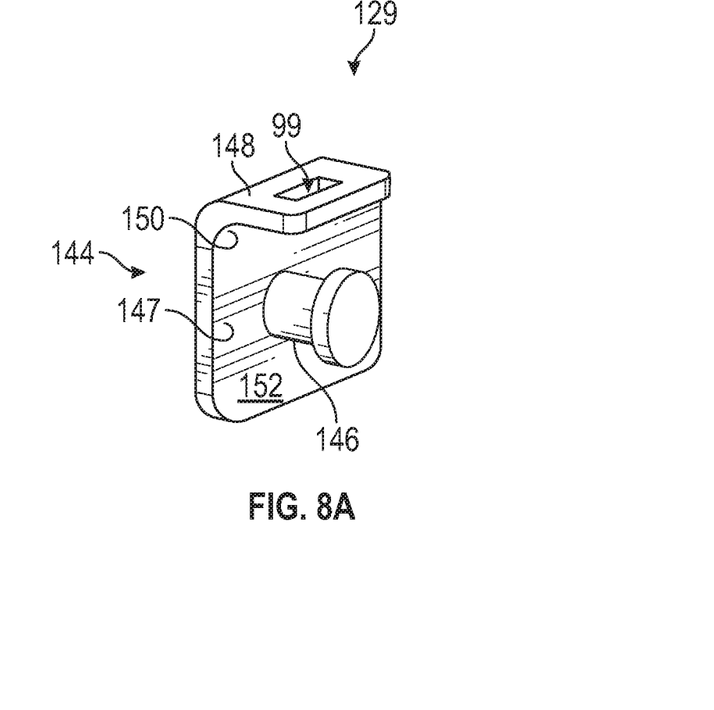
FIGS. 8A and 8B illustrate a plate assembly of the tailgate tie down system of FIG. 7.

As shown in FIG. 8A, each of the first and second plate assemblies 129, 130 may include a plate body 144 and a striker barrel 146. In an embodiment, the plate body 144 includes a vertical section 147 and a horizontal section 148 that extends from transversely away from an upper portion 150 of the vertical section 147. The striker barrel 146 may protrude outwardly from an inner surface 152 of the vertical section 147.

Figure 8B:
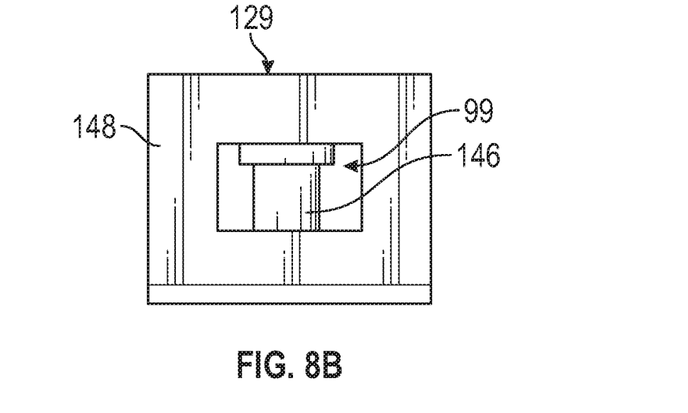

In another embodiment, best illustrated in FIG. 8B, the horizontal section 148 includes a tie down device 99. The tie down device 99 may take the form of an opening, a flange, a ring, a combination of an opening and flange or ring, or any other surface or shape. The separate device 132 may be inserted through an opening of the tie down devices 99 and connected to a flange of the opposing plate assemblies 129, 130 in order to secure the long stock cargo 28 at a rearward location of the tailgate 18.

The tailgate tie down systems of this disclosure provide users with the ability to tie down long stock cargo at rearward locations of a vehicle tailgate. In addition, the tailgate tie down systems disclosed herein may be locked to the tailgate using existing tailgate hardware, thus providing the ability to lock accessory devices to the tailgate without increasing manufacturing costs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    routing a strap of a tailgate tie down system through at least one accessory tool;
    securing a first plate assembly and a second plate assembly of the tailgate tie down system within opposing latch openings of a tailgate; and
    locking the first and second plate assemblies within the opposing latch openings, thereby locking the accessory tool relative to the tailgate,
    wherein each of the first and second plate assemblies includes a plate body and a striker barrel,
    wherein the plate body includes a vertical section and a horizontal section, and the strap is connected to the horizontal section,
    wherein the horizontal section includes a slot and the strap is positioned through the slot and is removably secured to an underside of the horizontal section by a fastener.

2. The method as recited in claim 1, comprising opening the tailgate prior to routing the strap and securing the first and second plate assemblies.

3. The method as recited in claim 1, wherein securing the first and second plate assemblies includes:
    positioning a first striker barrel of the first plate assembly within a first of the opposing latch openings;
    engaging a first latch arm around the first striker barrel;
    positioning a second striker barrel of the second plate assembly within a second of the opposing latch openings;
    engaging a second latch arm around the second striker barrel.

4. The method as recited in claim 3, wherein locking the first and second plate assemblies includes:
    actuating a powered latch actuator to lock a positioning of the first latch arm and the second latch arm.

5. The method as recited in claim 4, comprising:
    actuating a key fob or a switch to command the powered latch actuator to lock the positioning of the first latch arm and the second latch arm.

6. The method as recited in claim 1, wherein the strap is irremovably connected to each of the first and second plate assemblies when the first and second plate assemblies are secured within the opposing latch openings.

7. The method as recited in claim 1, comprising:
    tightening the strap between the first and second plate assemblies with a ratchet.

8. The method as recited in claim 1, wherein the tailgate is connected to a truck bed of a pickup truck.

9. The method as recited in claim 1, comprising:
    prior to routing the strap, removing the strap from at least one of the first plate assembly or the second plate assembly.

10. The method as recited in claim 1, comprising securing the first plate assembly and the second plate assembly within the opposing latch openings of the tailgate prior to routing the strap through the at least one accessory tool.

11. The method as recited in claim 1, wherein routing the strap through the at least one accessory tool includes:
    routing the strap through both a first accessory tool and a second accessory tool of the at least one accessory tool.

12. The method as recited in claim 11, wherein the first accessory tool is a different tool than the second accessory tool.

13. The method as recited in claim 1, wherein the at least one accessory tool includes a miter saw, a power pack, a compressor, or a radio.

* * * * *